(No Model.) 3 Sheets—Sheet 1.
L. B. ATKINSON, H. W. RAVENSHAW & F. MORI.
APPARATUS FOR CUTTING MINERALS.
No. 481,921. Patented Sept. 6, 1892.
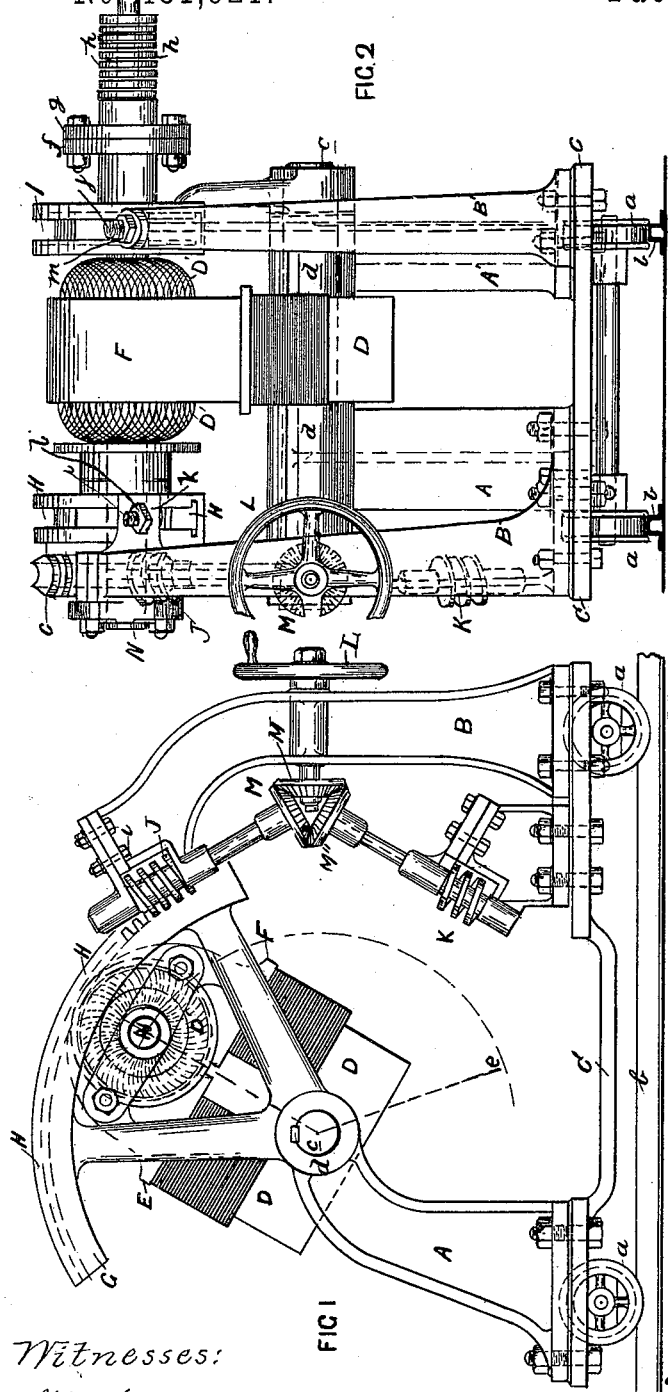
Witnesses:
H. Kusterer
Chester E. Ormens
Inventors:
Llewelyn B. Atkinson
Henry W. Ravenshaw
Fredrick Mori
By Richards
Attorneys.

(No Model.) 3 Sheets—Sheet 2.
L. B. ATKINSON, H. W. RAVENSHAW & F. MORI.
APPARATUS FOR CUTTING MINERALS.
No. 481,921. Patented Sept. 6, 1892.
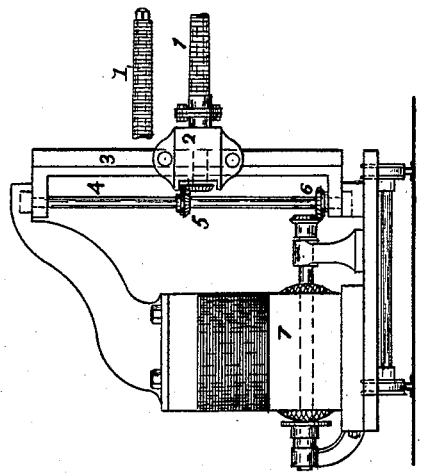
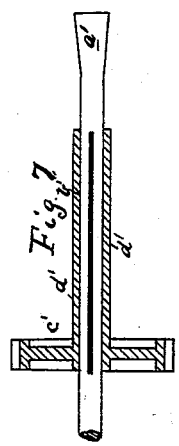
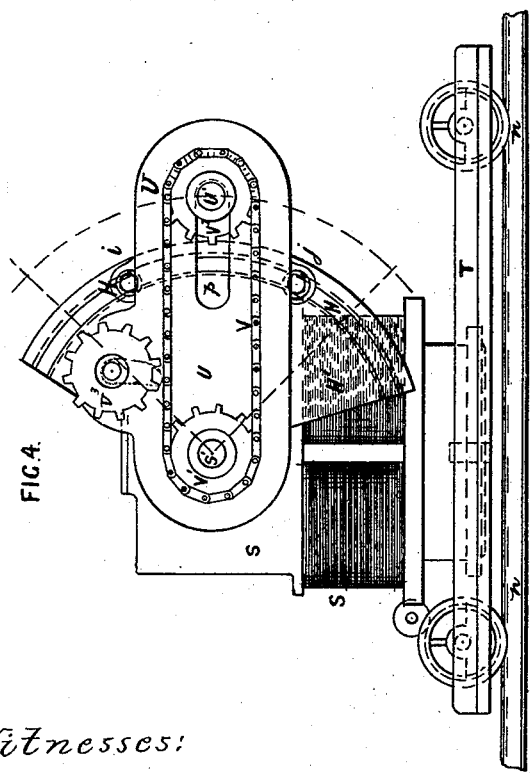
Witnesses:
H. Kusterer
Inventors:
Llewelyn B. Atkinson
Henry W. Ravenshaw
Fredrick Mori
By Richards
Attorneys.

(No Model.) 3 Sheets—Sheet 3.

L. B. ATKINSON, H. W. RAVENSHAW & F. MORI.
APPARATUS FOR CUTTING MINERALS.

No. 481,921. Patented Sept. 6, 1892.

Witnesses:
Alvan Belt
Geo. H. Brown Jr.

Inventors:
Llewelyn B. Atkinson
Henry W. Ravenshaw
Fredrick Mori.

By Richards & Co.
Attorneys

UNITED STATES PATENT OFFICE.

LLEWELYN B. ATKINSON AND HENRY W. RAVENSHAW, OF LONDON, AND FREDRICK MORI, OF LEEDS, ENGLAND.

APPARATUS FOR CUTTING MINERALS.

SPECIFICATION forming part of Letters Patent No. 481,921, dated September 6, 1892.

Application filed August 18, 1891. Serial No. 403,071. (No model.) Patented in England October 18, 1887, No. 14,090.

*To all whom it may concern:*

Be it known that we, LLEWELYN BIRCHALL ATKINSON and HENRY WILLOCK RAVENSHAW, of London, and FREDRICK MORI, of 125 Meanwood Road, Leeds, England, have invented an Improvement in Apparatus for Cutting Minerals, (which has been patented to us in Great Britain under No. 14,090 and dated October 18, 1887,) of which the following is a specification.

This invention has reference to machines for cutting, boring, or drilling coal or other minerals; and it consists principally in means for working the cutter at any height by electricity, steam, or other motive power.

In order that our invention may be more fully understood, reference is herein made to the several figures on the annexed sheets of drawings, and to the letters and figures of reference marked thereon.

Figure 6:
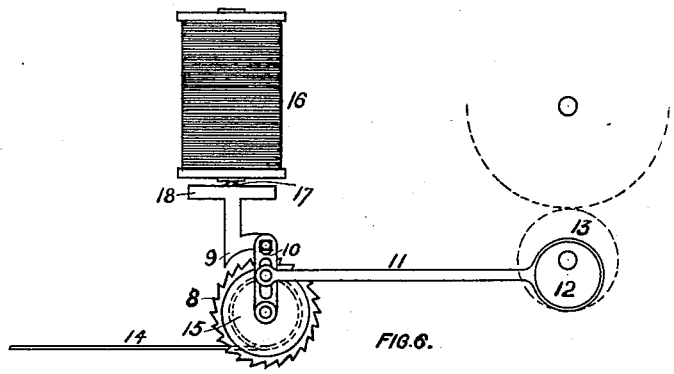
Figure 6A:
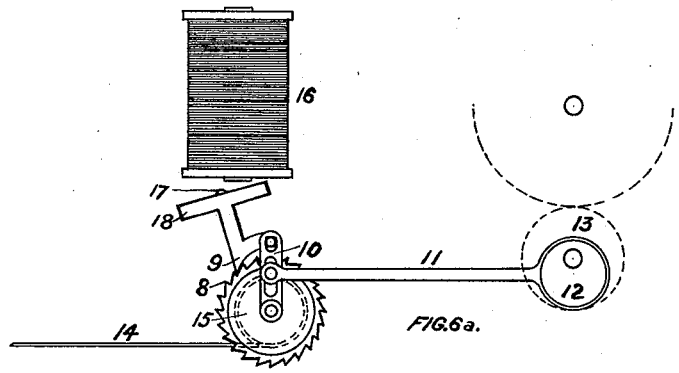

Figure 1 is a side elevation of a machine for cutting, boring, or drilling coal or other minerals, showing the application of our improvements for working the drill or cutter at any height and for readily adjusting, altering, or varying the height of the said drill or cutter, and this can be done without interfering with the rotary motion thereof. Fig. 1$^a$ is a detail view of the magnet and pole-pieces. Fig. 2 is an end elevation of same. Fig. 3 is a detail showing a modification of means for altering or varying the height of the cutter. Fig. 4 shows a modification of a machine in which the cutter-bar is worked by chain-gear from the armature-shaft. Fig. 5 is a further modification, the cutter-bar being worked by bevel-gear from the armature-shaft. Figs. 6 and 6$^a$ show rope-feed gear to traveling carriage, out of and in gear, respectively. Fig. 7 is a section through a drill as applied to the machine.

A A' and B B' are pillars or pedestals bolted to the bed-plate C, which is carried by wheels or runners $a$, resting upon rails $b$.

D is an electro-magnet, while D' is the armature, and E and F the poles, the whole forming an ordinary electromotor of such size and design as will give the best results.

The magnet bar or bars $c$ or extensions thereof extend from each side of the motor and pass through the bosses or bearings $d$ on the pillars A A', which therefore form the fulcra, upon which the motor is free to revolve.

Keyed or otherwise fastened at one extremity of the magnet-bar $c$ is a segment of a circular worm-wheel G, to which is cast or otherwise secured a piece bearing the segment of a circular slot H, and at the opposite extremity of said magnet-bar $c$ is another or corresponding circular slot I. Two worms are shown at J and K, which engage successively or simultaneously with the segment worm-wheel G, according to whether it is at an intermediate or extreme position, and are operated by the hand-wheel L, which conveys a rotary motion to the said worms in either direction by means of the bevel-wheels M M' M$^2$, as will be well understood.

The drawings show the electromotor at its highest position with respect to the working-face of the mineral, and when it is moved in the direction of the arrow as far as the dotted line $e$ the said motor has reached its lowest position.

The spindle N, which passes through the armature D', is provided at one end with a flange $f$, to which is bolted the flange $g$ of the cutter or drill, which in one form may consist of a square bar or spindle, upon which are placed a number of disks $h$, having pointed or serrated edges, the diameter of each disk decreasing toward the outer extremity of the square bar or spindle, so that when the whole of the disks are secured onto the said spindle by nut or other device they form or compose a tapered cutter for cutting the coal or other mineral. When the position of the cutter-bar requires raising or lowering, the attendant operates the hand-wheel L, communicating motion thereby to bevel-wheels M, M', and M$^2$ and to the worms J and K, the latter of which causes the segment worm-wheel G, and consequently the electromotor, to move upon their axes or fulcra to any predetermined position.

In the circular slots H and I are the heads of T-headed bolts $i$ and $j$, the former of which passes through the bracket $k$, bolted or cast to the pillar B, while the latter passes through the upper end of the pillar B', both of such bolts being provided with nuts $l$ and $m$, which must be loosened or eased when the motor and segments are being moved upon their fulcra; but when the cutter has been brought to the desired position the nuts $l$ and $m$ are tightened, so as to firmly and securely clamp the segments to the pillars.

In detail, Fig. 3, we have shown a modification of the means employed for moving the electromotor upon its fulcrum. In this case we dispense with the worms J and K, and in place thereof we use one or more pinion-wheels P P', which engage simultaneously or successively with the toothed segment. The pinions may have hand-wheels on their shafts for imparting the requisite rotary motion thereto, or an intermediate wheel R, provided with a hand-wheel on its shaft, may be employed for communicating rotary motion to each pinion, and consequently to the segment and cutting-tool.

In the foregoing description with respect to Figs. 1, 2, and 3 we have shown the drill or cutting-tool as being worked direct off the shaft of the electromotor; but in Fig. 4 we show a modification of apparatus for cutting minerals. In this case the drill or cutter is not worked direct from the shaft of the motor, but by chain and gears.

S represents the electromotor, comprising poles, armature, and electro-magnet, as previously explained, resting upon and supported by the bed-plate T, having wheels or runners for traveling upon the rails $n$.

Upon the motor-shaft S' and on each side of the motor we place the frames U, carrying the cutter-bar U'.

V is a pitch-chain passing around the gears V' V², mounted on the motor and cutter-shaft, respectively, so that as the motor-shaft revolves rotary motion will be communicated by means of chain V and gear V² to the cutter-shaft U'. A slot $p$ may be formed in the frames U, so that the cutter-shaft can be placed nearer to the motor-shaft or its position otherwise altered. When the cutter-shaft is at its greatest distance from the motor-shaft, as shown in Fig. 4, the upper and lower portions of the chain are parallel and the chain V at a suitable driving tension; but when the cutter-shaft is brought nearer to the spindle of the motor, or when it has stretched by wear, so that the driving-chain is slackened, the intermediate wheel V³ is arranged to work in a vertical slot in the frame U, so that by moving the said wheel the slack in the chain is taken up. The height of the cutter is regulated by the bolts and nuts $i$ and $j$, which work in the circular slot H, formed in the casting H'.

Instead of employing pitch-chain and gears for driving the cutter-bar, ordinary gearing may be used and the intermediate wheel or pinion V³ arranged to work in a circular slot.

In certain cases, where the power applied is not very large, the cutter may be carried in a bearing, moving both vertically and in horizontal planes and secured to a pillar, which may approach close to the ground and the power transmitted to it by a double train of bevel-wheels or other well-known forms of driving. This part of our invention is shown at Fig. 5, where 1 is the cutter-bar carried by a bearing 2, secured to a pillar 3, which is supported by the shaft 4, carrying the double train of bevel-wheels 5 and 6 for imparting rotary motion from the electromotor 7 to the cutter-bar 1. The shaft 4 forms the axis, upon which the pillar 3 is capable of moving horizontally, so as to place the cutter in any position in a horizontal plane; but in order to move the cutter to any position vertically the bearing 2 is moved up or down the pillar 3 and secured by bolts 8 or other devices. The horizontal motion of the cutter by means of the pillar may be controlled by a worm-wheel or other device.

In machines where the motion is required to be continuously applied to maintain the cutting-feed we apply a wheel to the motor or cutter shaft, which gears by chains or wheels to a shaft carrying an eccentric or crank-arm in an adjustable slot, this rocking arm working either a ratchet and pawl or silent-feed frictional pawl, which operates a winch or wheel where the machine is drawn along by a rope or working into the axle or axles of the machine, so that it becomes its own locomotive, and in certain cases where it is desired to work the machines to their full output at all times and where the work is variable the ratchet or silent feed is under the control of an electro-magnetic device, which when the electromotor is receiving its full or more than full current corresponding to its maximum output throws the ratchet out of gear, or in the case of the silent feed may modify the effective stroke, or it may be regulated by hand. This part of our invention is shown at Figs. 6 and 6ª, where 8 is a ratchet-wheel, into the teeth of which takes a pawl 9, secured to the arm 10, placed loosely on the ratchet-wheel shaft. 11 is a rod, one end of which is secured in the slot of the arm 10, and is therefore adjustable, the opposite end having a strap passing around an eccentric 12, fixed on a shaft carrying a gear-wheel 13, which may be geared by wheels or chains to the motor-shaft, from whence motion is communicated to the eccentric 12. As the eccentric revolves it reciprocates the arm 10 and pawl 9 thereon, consequently causing the ratchet-wheel 8 to move forward one or more teeth, the result being that when the machine is drawn along by means of a rope 14 the drum 15 on the ratchet-wheel shaft will also be partially rotated, thereby winding on the rope, by which means the machine advances automatically. When the machine is not drawn along by means of a rope, a ratchet-wheel may be secured onto the axle of the wheels or runners $a$ in Fig. 1, or motion is communicated to the said axle or axles through a suitable arrangement of gearing. 16 is an electro-magnet, which when the electromotor is receiving its full or more than full current corresponding to its maximum output is so strongly magnetized as to attract and draw the pawl 9 out of gear with the ratchet-wheel 8, and thereby stop the machine from traveling, so that no more cutting is done until the machine has been attended to, or by working itself clear has diminished the load on the motor. A brass pin 17 is employed to prevent absolute contact between the electro-magnet and iron block 18, thus insuring the descent of the pawl into gear with the ratchet-wheel as soon as the current passing through the electro-magnet is reduced.

When the machine is to be used for drilling, the drill or drills work in a hollow spindle or tube or otherwise. In the spindle which carries the drill or drills is a keyway, square, or thread, and in the wheel which gives motion to the drill or drills is a corresponding square, key, or thread, which enables the drill or drills to be pushed forward or drawn backward while in motion. A number of drills can be used at the same time, if required, by multiplying the gearing, and also a striking or tapping motion can be communicated to the drill or drills by means of an eccentric motion, This part of our invention is shown in Fig. 7, where $a'$ represents a drill made with a keyway $b'$, and $c'$ is a driving-wheel provided with a long tube $d'$, also made with a corresponding keyway. If, therefore, a key is placed in the boss of the wheel and entering the two keyways, the rotary motion of the wheel will also revolve the cutter-bar. If, therefore, the machine is at work and employed in drilling or boring, the cutter-bar will not only revolve, but can also be made to advance by means of the keyway, as will be well understood.

Having now particularly described and ascertained the nature of our said invention and in what manner the same is to be performed, we declare that what we claim is—

1. In a machine for cutting coal or other minerals, an electrical motor carrying a cutter-bar on the axis of its armature and provided with trunnions formed from magnet-yoke $c$, journaled in bosses $d\ d$ in frames A A' upon a traveling carriage, in combination with a rack segment or quadrant G, keyed to the said trunnions and operated by a pair of worms J K, geared by bevel-wheels to hand-wheel L to adjust the motor and the cutter-bar to any desired height, the motor and bar being adapted to clamp in such position by bolt-heads and nuts traveling in fixed radial slots H I, substantially as described.

2. In a machine for cutting coal or other minerals, an automatic rope-feed for the traveling cutting-machine and cutter, consisting of a rope-drum 15, operated by a ratchet-wheel 8, driven by a pawl 9, receiving reciprocating movement by an eccentric motion 11 12 from a shaft rotated from the motor axis, and a disengaging electro-magnet 16, to which the pawl-arm 18 forms an armature adapted so as to lift the pawl out of gear when there is excess of electrical current passing through the motor, the feed being thus automatically stopped until the cutter is relieved, substantially as described.

In testimony whereof we have signed our names to this specification in the presence of two subscribing witnesses.

LLEWELYN B. ATKINSON.
HENRY W. RAVENSHAW.
FREDRICK MORI.

Witnesses as to Atkinson and Ravenshaw:
 HENRY W. COLE,
 CHARLES F. ARROWSMITH.
Witnesses as to Fredrick Mori:
 EDWIN MOORHOUSE,
 WILLIAM A. WEST.